(12) United States Patent
Broer et al.

(10) Patent No.: US 8,921,806 B2
(45) Date of Patent: Dec. 30, 2014

(54) PHOTO-RESPONSIVE LAYER AND LAYER ASSEMBLY

(75) Inventors: Dirk Jan Broer, Geldrop (NL); Emiel Peeters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 119 days.

(21) Appl. No.: 13/497,568

(22) PCT Filed: Oct. 6, 2010

(86) PCT No.: PCT/IB2010/054519
§ 371 (c)(1),
(2), (4) Date: Mar. 22, 2012

(87) PCT Pub. No.: WO2011/045712
PCT Pub. Date: Apr. 21, 2011

(65) Prior Publication Data
US 2012/0223248 A1 Sep. 6, 2012

(30) Foreign Application Priority Data
Oct. 16, 2009 (EP) .................... 09173308

(51) Int. Cl.
C02F 1/32 (2006.01)
C02F 5/10 (2006.01)
A61L 2/10 (2006.01)
C09K 19/58 (2006.01)
C09K 19/24 (2006.01)
C09K 19/54 (2006.01)
C09K 19/20 (2006.01)
C09K 19/04 (2006.01)

(52) U.S. Cl.
CPC ........... *C02F 1/325* (2013.01); *C02F 2201/326* (2013.01); *C09K 19/588* (2013.01); *C09K 19/24* (2013.01); *C09K 2019/0448* (2013.01); *C09K 19/54* (2013.01); *C09K 19/2007* (2013.01); *C02F 2209/40* (2013.01); *C09K 2219/03* (2013.01)
USPC ......... 250/436; 250/435; 252/180; 210/748.1

(58) Field of Classification Search
CPC ...... C09K 19/24; C09K 19/54; C09K 19/588; C09K 2109/0448; C09K 2219/03; C02F 1/325; C02F 5/10; C02F 2209/40; A61L 2/08
USPC .......... 252/180, 299.01, 299.5; 250/435, 436; 210/748.1
See application file for complete search history.

(56) References Cited

U.S. PATENT DOCUMENTS 3,413,465 A 11/1968 Harrison et al.
2003/0166840 A1 9/2003 Urry et al.

FOREIGN PATENT DOCUMENTS

EP 0064071 B1 5/1985
WO 2007086487 A1 8/2007

OTHER PUBLICATIONS

Tomiki Ikeda et al, "Anisotropic Bending and Unbending Behavior of Azobenzene Liquid-Crystalline Gels by Light Exposure", Advanced Materials, Wiley-VCH Verlag, GmbH & Co, vol. 15, No. 3, Feb. 5, 2003, pp. 201-205.
Armagan Kocer et al, "A Light-Actuated Nanovalve Derived from a Channel Protein", Science, vol. 39, Jul. 29, 2005, pp. 755-758.
Surjith K. Kumar et al, "Photoresponsive Ion Gating Function of an Azobenzene Polyelectrolyte Multilayer Spin-Self-Assembled on a Nanoporous Support", Langmuir 2008, vol. 24, No. 8. pp. 4190-4193.
Keiichi Kimura et al, "Application of Photoresponsive Polymers Carrying Crown Ether and Spirobenzopyran Side Chains to Photochemical Valve", Journal of Nanoscience and Nanotechnology, vol. 6, pp. 1741-1749, 2006.

*Primary Examiner* — Shean C Wu

(57) ABSTRACT

The present invention relates to a photo-responsive layer and layer assembly which can be used for controlling a flow of liquid for example in a water-purification device. The photo-responsive layer according to the invention comprises a first domain comprising a first material comprising molecules having a photo-responsive moiety, wherein the first domain of the photo-responsive layer is capable of undergoing a reversible geometrical change when said photo-responsive moiety is exposed to photo-activating illumination, such as UV-radiation. The photo-responsive layer is useful in UV controlled membranes e.g. for water purification.

15 Claims, 7 Drawing Sheets

PHOTO-RESPONSIVE LAYER AND LAYER ASSEMBLY

FIELD OF THE INVENTION

The invention relates to the technical field of UV-purification of liquids, especially water.

BACKGROUND OF THE INVENTION

It is well-known that UV-radiation can kill microorganisms in water such as bacteria, viruses, molds, algae, yeast, and oocysts like *Cryptosporidium* and *Giardia*. This knowledge is today applied in various water purification systems aiming at the production of safe drinking water. An example of such water purification system is a water purification system which incorporates a UV lamp around which water flows.

In all these systems it is essential that the water supply stops as soon the UV source diminishes, otherwise unsafe drinking water may be produced and consumed. Checking the UV intensity at the location where water purification should take place can be done by a UV sensor which, when connected to an electromagnetic valve, may stop the flux of water. An example of such a UV-sensor is disclosed in U.S. Pat. No. 3,413,465, which discloses an apparatus for sterilizing fluids, such as drinking water through the use of ultraviolet radiation. The apparatus disclosed in U.S. Pat. No. 3,413,465 comprises a valve assembly at the fluid inlet which is arranged to control the flow of water. The valve assembly comprises an electromagnetic valve using a metal ball and an electron magnet which is controlled by an external photochemical cell. When sufficient amount of UV-radiation is detected by the external photochemical cell, the electromagnet is energized and holds the metal ball so that it provides an open fluid inlet. When too low amount of UV-radiation is detected by the photochemical cell, the electromagnet is switched off, which results in that the metal ball in the valve instead covers the fluid inlet, so that no fluid can pass through the apparatus.

However for some applications a more autonomous response is desired. For example, in third world countries, sometimes use is made of the UV part of the UV-radiation spectrum of sun light to purify potential contaminated water. Especially at locations where use is made of sun light as UV source electricity is not always available. However, also in the case of lamp operated systems an autonomous system would be advantageous.

Therefore, there is still a need in the art to find new technical solutions for purification of water and other fluids.

SUMMARY OF THE INVENTION

It is an object of the present invention to at least partly overcome the above problem, and to provide a UV-radiation controlled photo-responsive layer which for example can be used in a photo-responsive layer assembly in a fluid purification system.

According to a first aspect of the invention, this and other objects are achieved by a photo-responsive layer comprising a first domain which comprises a first material comprising molecules having a photo-responsive moiety, wherein the first domain of said photo-responsive layer is capable of undergoing a reversible geometrical change when the photo-responsive moiety is exposed to photo-activating illumination. By using such photo-responsive layer, it is possible to switch the geometrical shape of the photo-responsive layer from a first state of a first geometrical shape when not under exposure to photo-activating illumination to a second state of a second geometrical shape when exposed to the photo-activating illumination. Advantageously, the first domain is capable of undergoing a reverse geometrical change when the photo-responsive moiety is not under exposure to photo-activating illumination. Thereby, the photo-responsive layer can be switched reversibly between a passive state and an active state, repeatedly, by the use of suitable photo-activating illumination. The layer can advantageously be used for controlling the flow through water-purification systems. However, the layer may also be used for other technical applications where the control of geometry by illumination is desired, for example in the field of functional surfaces.

In embodiments of the invention, the geometrical change provides a topographic change of the photo-responsive layer such as a change of the thickness of the layer or a change resulting in the formation of protrusions and/or recessions.

In embodiments of the invention, the first material of the photo-responsive layer includes a first molecularly ordered phase. Thereby, the shift in geometrical change may be increased compared to using materials comprising randomly distributed molecules.

The wavelengths used for photo-activating illumination depends on which photo-responsive moiety that is used. The illumination should be of wavelengths inducing a photo-response in the photo-responsive layer. In embodiments of the invention, the photo-activating illumination is UV-radiation, for example in the range of 100-400 nm. By using photoactive moieties that are responsive to UV-radiation, a layer is provided which is useful for autonomous response in for example water-purification systems.

In embodiments of the invention, the first material is a liquid crystal polymer material, for example having a network structure. By using a liquid crystal polymer material in combination with a photo-responsive moiety, a wide range of possibilities for molecular ordering can be obtained. For example, the first molecularly ordered phase may be a nematic phase, such as a chiral nematic phase. Thereby, when exposed to photo-activating illumination, the molecular order in the liquid crystalline polymer material will change, for example to an isotropic ordering resulting in geometric extension in z-direction, providing protrusions on the surface of the layer when under exposure to photo-activating illumination.

In embodiments of the invention, the photo-responsive moiety is a moiety capable of photo-isomerization. This is a preferred photo-reaction, since it is reversible and since no side-products are released, when undergoing the geometrical change. Advantageously, the photo-responsive moiety comprises an azocompound such as azobenzene or a derivative thereof. Alternatively, other compounds capable of undergoing isomerization such as trans/cis-transition may be used for the photo-responsive moiety. For example, spiro oxazines or stilbenes, or derivates thereof, may be used. It was found that such moieties provided in a material having a molecular ordering provides for an effective change of the molecular ordering and geometry when exposed to photo-activating illumination.

In embodiments of the invention, the photo-responsive layer further comprises a second domain comprising a second material, which may be a material which is capable of undergoing a reversible geometrical change when exposed to photo-activating illumination. The second material may have a second molecularly ordered phase, different from the first molecularly ordered phase, comprising molecules having a photo-responsive moiety, wherein the second domain is capable of undergoing a geometrical change when the photo-responsive moiety of the second domain is exposed to photo-activating illumination, wherein the geometrical change is different from the geometrical change of the first domain.

By using such second material, a photo-responsive layer may be provided which provides increased possibility of controlling the geometrical shape of the layer using photo-activating illumination. For example, when exposed to photo-activating illumination, protrusions may be formed in the first domains, and recessions may be formed in the second domains, or vice versa. Preferably, the second material is a liquid crystal polymer material. By using liquid crystal polymer material in combination with a photo-responsive moiety also in the second domains, a wide range possibility of different topographies can be achieved. Hence, the molecular ordering can be varied depending on the technical application. For example, the second molecularly ordered phase may be a homeotropic phase. This is advantageous for example in combination with a first domain comprising a nematic phase, since the topography when exposed to photo-activating illumination hence would comprise increased topographical differences compared to using a second material not responsive to illumination. Preferably, the second domain is capable of a reverse geometrical change when the activating illumination is discontinued.

In some embodiments, it may be advantageous to use an isotropic phase in the second domain, i.e. the second molecularly ordered phase may be an isotropic phase. This is preferred for applications where sufficient geometric change is provided by the first domains. In these cases, it is not necessary to further functionalize the second domains and thereby for example the production costs can be lowered.

According to a second aspect, the invention relates to a photo-responsive layer assembly comprising a fluid transmissive layer, and a photo-responsive layer according to the invention arranged in contact with the fluid transmissive layer, wherein under photo-activating illumination, the photo-responsive layer is capable of a topographic change allowing for opening of at least one fluid path passing by the photo-responsive layer and through the transmissive layer such as to allow for flow, or increased flow, of a fluid through the photo-responsive layer assembly. The fluid transmissive layer may be a layer wherein at least part of the layer is water pervious so that water can be transported through the transmissive layer.

By combining the photo responsive layer with a fluid transmissive layer, a wide range of different advantageous photo-responsive layer assemblies can be constructed, for example for use as water-flow controlling membranes responsive to certain illumination.

In embodiments of the invention, the photo-responsive layer assembly has a maximum average fluid path, or channel, diameter in the range of 0 to 1 μm, preferably 0 to 0.02 μm, when not under exposure to the photo-activating illumination. Thereby, the photo responsive layer assembly may either prevent flow of water, or function as a water filter which admits a flow of water, but which prevents contaminants such as viruses and/or bacteria to pass the layer assembly when not exposed to photo-activating illumination. Hence, the invention provides the possibility to use a system which when exposed to UV-radiation is open transmitting also biological species which are subsequently killed by the UV-radiation and which in absence of UV irradiation, allows water to flow through pores (or channels) which are so small that biological species are filtered out. In absence of UV-radiation, the water purification system thus still continues working but at a lower yield.

According to a third aspect, the invention relates to a method for controlling a photo-responsive layer assembly according to embodiments of the invention, comprising exposing the photo-responsive layer to UV-radiation, such that the photo-responsive layer undergoes a topographical change in response to UV-radiation, whereby the photo-responsive layer shifts from a state of fluid-tight arrangement or low flow arrangement with the transmissive layer to a state of fluid transmissive arrangement or high flow arrangement with the transmissive layer, the fluid transmissive arrangement comprising at least one fluid path passing by the photo-responsive layer to the transmissive layer, wherein flow through the photo-responsive layer assembly is allowed or increased. By the method it is possible to control the flow of water using photo-activating illumination. Hence, the invention provides for the possibility to control water flow depending on the illumination without using an electrical sensor (and electromagnetic valves).

According to a fourth aspect, the invention relates to a fluid purification device comprising a UV-radiation chamber having a fluid inlet and a fluid outlet, and a flow control device arranged in the fluid inlet or fluid outlet, wherein the flow control device comprises a photo-responsive layer assembly as described herein. The invention thus provides a fluid purification system which is operated and controlled without need of electricity.

According to a fifth aspect, the invention relates to a method for producing a photo-responsive layer according to the invention comprising: providing a substrate, applying a composition to the substrate forming a layer on the substrate, wherein the composition comprises monomers being both UV-radiation responsive and capable of forming an molecularly ordered phase, and/or monomers being UV-radiation responsive and monomers capable of forming a molecular ordered phase, and a photo-initiator; selectively polymerizing a first domain of the monomers by photo-polymerization; rearranging the monomers in the second domain by heating, applying an electrical field or an external magnetic field; and allowing the second domain to polymerize by photo-polymerization.

According to a sixth aspect, the invention relates to a method for producing a photo-responsive layer as described herein, comprising providing a discontinuous layer on a substrate; applying a composition comprising a monomer being photo-responsive and optionally a photo-initiator on at least one region of the substrate not covered by the discontinuous layer, thus forming the first domain, polymerizing the monomers of a first domain to polymerize or allowing said monomers to polymerize, optionally by photo-polymerization.

In embodiments of the invention, the photo-initiator is activated by wavelengths above 400 nm. This is advantageous when the photo-responsive moiety is responsive to illumination within the UV-range, such as 100-400 nm, since the photoactive moieties then do not undergo the photo-responsive reaction, during the polymerization step of the method.

According to a seventh aspect, the invention relates to the use of a photo-responsive layer according to the invention in a system for purification of water.

It is noted that the invention relates to all possible combinations of features recited in the claims.

BRIEF DESCRIPTION OF THE DRAWINGS

These and other aspects of the present invention will now be described in more detail, with reference to the appended drawings schematically showing embodiment(s) of the invention. As illustrated in the figures, the sizes of layers and regions are exaggerated for illustrative purposes and, thus, are provided to illustrate the general structures of embodiments of the present invention.

DETAILED DESCRIPTION OF THE EMBODIMENTS

The present invention relates inter alia to a photo-responsive layer, a photo-responsive layer assembly comprising the photo-responsive layer, a method for controlling a flow of liquid using the photo-responsive layer, a fluid purification device comprising the photo-responsive layer, and methods for producing the photo responsive layer. In the following detailed description, preferred embodiments of the invention will be described. However, it is to be understood that features of the different embodiments are exchangeable between the embodiments and may be combined in different ways, unless anything else is specifically indicated.

Figure 1A:
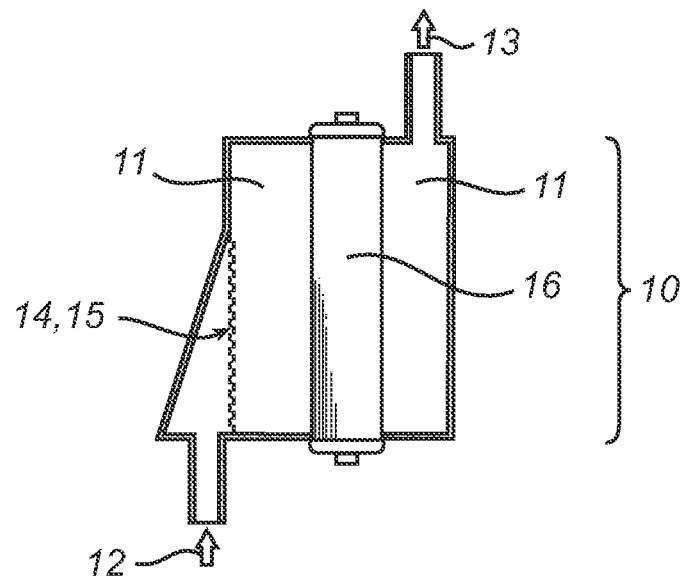
FIG. 1a shows a UV-lamp operated water-purification device comprising a photo-responsive layer according to embodiments of the invention.
Figure 1B:
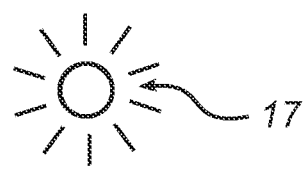
FIG. 1b shows a sunlight operated water-purification device comprising a photo-responsive layer according to embodiments of the invention.
Figure 1B:
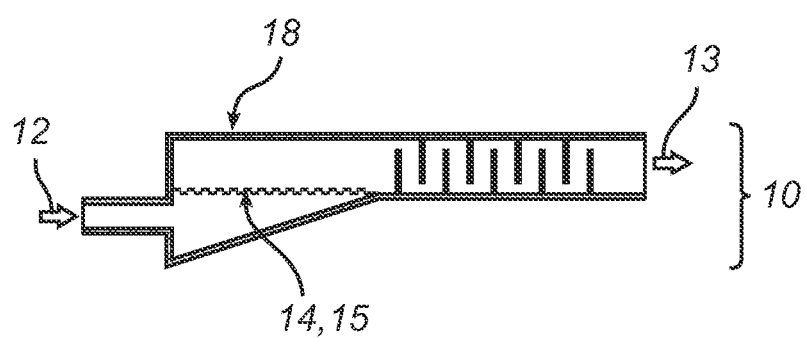

FIG. 1a illustrates an example of a UV-lamp operated fluid purification device according to the invention, and FIG. 1b illustrates an example of sun light driven water-purification device according to the invention. The fluid purification device 10 comprises a UV-radiation chamber 11 having a fluid inlet 12 and a fluid outlet 13, and a flow control device 14 comprising a photo-responsive layer or layer assembly 15 arranged in the fluid inlet 12. The device 14 could also be located at the fluid outlet 13. A UV lamp 16 is arranged to illuminate the fluid in the chamber 11 and thus to kill microorganisms. Alternatively, the UV component of sunlight 17 is used to illuminate the fluid in the chamber 11, thus to provide antimicrobial effect. This may be achieved by using for example a chamber which at least partly comprises a UV transmissive layer 18.

The photo-responsive layer or layer assembly 15 is arranged to control the flow of water/fluid through the chamber 11 of the purification device 10. In active state, i.e. during photo-activating illumination, the photo-responsive layer allows for flow through the flow control device, while in passive state, that is when not sufficient photo-activating illumination is present, the flow is prevented from passing through the layer assembly. Alternatively, in passive state, the photo-responsive layer allows for decreased flow of water and may function as a water filter, having narrow channels which allow water to pass but which filter out viruses, bacteria and other contaminants from passing through the layer assembly. Hence, the flow of liquid/water is controlled depending on whether or not the layer is illuminated by photo-activating illumination, such as UV-radiation.

The invention is useful in the purification of water and other liquids, such as for use as a UV activated valve. Hence, water purification devices can be provided which are not dependent on electrically controlled valves for control of the flow of water. Also, the present invention may be used as water/fluid filter to improve the efficiency of purification of any type of UV-based purification system. In addition, the invention is also useful for many other technical applications, e.g. in the field of microfluidics, wherein the photo-responsive layers can be used as pumps and can be used to create temporary channels, storage chambers or reaction vessels. In that case also the opposite effect might be useful, i.e. closed channels under UV exposure rather than open ones. The inventive photo-responsive layer and layer assembly can also be applied wherever a geometrical change in response to illumination is desired.

The photo-responsive layer according to the invention comprises at least one first domain comprising a first material comprising molecules having a photo-responsive moiety, wherein the first domain of the photo-responsive layer is capable of undergoing a reversible geometrical change when said photo-responsive moiety is exposed to photo-activating illumination. For example, the layer may be built from a material which includes a photo-responsive moiety which due to a chemical reaction or structural change when exposed to photo-activating illumination is capable of a geometrical change caused by a phase-shift. Such phase shift may be a change of crystalline phase or liquid crystal phase, but may also correspond to the geometrical change obtained in a material comprising randomly ordered molecules. For example, the shift may correspond to the geometrical change obtained due to illumination of a material causing a shift of the lower critical solution temperature (LCST).

The first material of the photo-responsive layer may include first domains having a molecularly ordered phase comprising a photo-responsive moiety. When exposed to illumination, the photo-responsive moiety causes a geometrical change in z-direction.

Thereby, the topography and thickness of the layer will change depending on if under exposure to photo-activating illumination or not, and on the construction of the photo-responsive layer. In case the photo-responsive layer only contains only one material having the homogeneous contents and molecular ordering, the geometrical change will result in a change of the thickness of the layer. In case the photo-responsive layer contains first domains of a first material including molecules having a photo-responsive moiety, and second domains of a second different material, the geometrical change may result in the formation of protrusions and/or recessions.

Figure 2A:
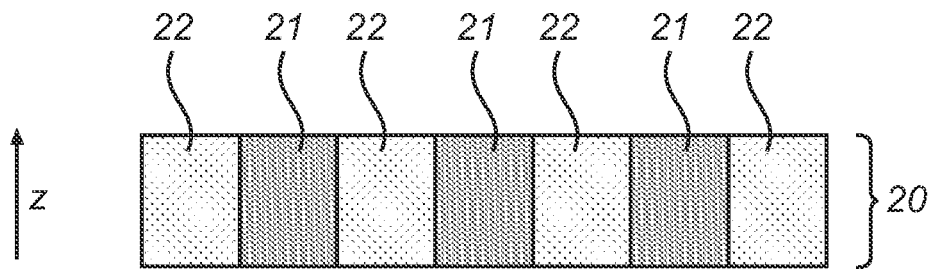
FIG. 2a shows an embodiment of the photo-responsive layer according to embodiments of the invention in its passive state.
Figure 2B:
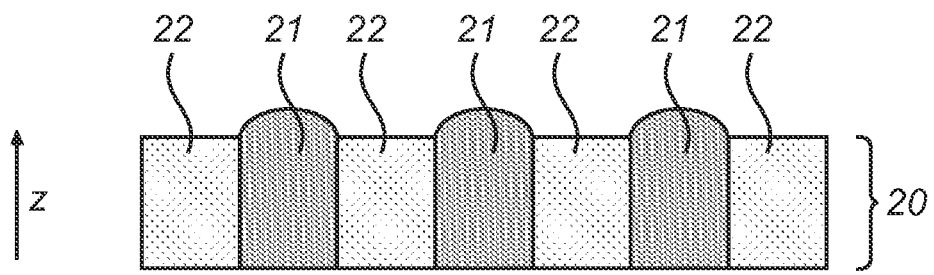
FIGS. 2b and 2c each shows an example of the photo-responsive layer according to embodiments of the invention in its active state.
Figure 2C:
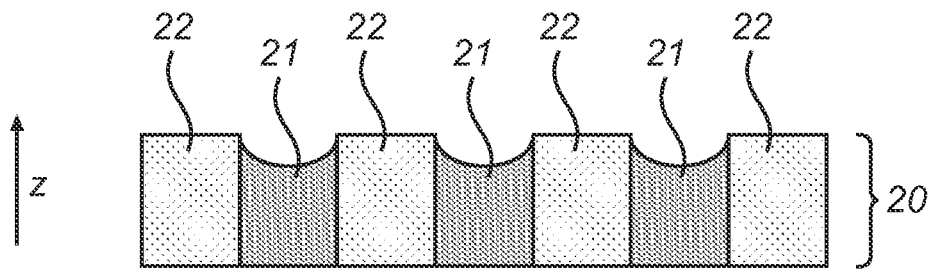

Referring to FIG. 2a, a photo-responsive layer according to the invention is illustrated in passive state. According to this embodiment, the photo-responsive layer 20 comprises first domains 21 comprising a first material having a first molecularly ordered phase comprising molecules having a photo-responsive moiety, and second domains 22 comprising a second material. The first domains 21 are arranged in the layer to provide photo-responsive zones of the photo-responsive layer. Therefore, the photo-responsive layer is capable of undergoing a geometrical change when exposed to photo-activating illumination, resulting in a change of topography, such as the formation of protrusions (or recessions). In a preferred embodiment, the layer comprises a plurality of the first and second domains. A photo-responsive layer forming protrusions in the first domains is illustrated in FIG. 2b and a photo-responsive layer forming recessions in the first domains is shown in FIG. 2c. The first material may be any material which includes a photo-responsive moiety resulting in a reversible geometrical change when exposed to photo-activating illumination. Optionally, the first material may comprise a molecular ordered phase. Preferably, the first domain undergoes a reverse geometrical change when the photo-responsive moieties present in the material of the first domain changes from active to passive state.

As used herein, "molecularly ordered phase" refers to molecules have a preferential orientation, or have certain degree of regularity or crystallinity. Such phases include liquid crystalline phases and types of molecular orientations, for example nematic, chiral nematic, smectic, chiral smectic, homeotropic phases, as well as other crystalline phases. Such phases may further include liquid crystal polymer networks.

As used herein, "photo responsive moiety" refers to a molecule or molecular group provided in the first material, which undergoes a chemical or structural change, for example photo-isomerization, when it becomes exposed to illumination. As used herein, "photo-responsive" is a synonym of photo-active. The photo-responsive moiety may be an azo-compound, spiro oxazine or stilbene or a derivate thereof. The moiety may be covalently bonded or electrostatically attached to the first material. The first material may be formed of a polymer comprising monomers of a compound which forms molecular order and monomers which are photo-responsive. The first material may for example include a liquid crystal polymer material and an azobenzene moiety as photo-responsive moiety. Alternatively, the first material may be formed of monomers forming molecular order, some or all of which include a photo-responsive molecular group. In addition, the first material may optionally comprise other additional monomers which for example may be used to control cross-linking and viscosity of the material.

As used herein, "photo-activating illumination" is defined as the specific types of illumination in response to which the photo-responsive layer undergoes a geometrical change. The type of photo-responsive moiety that is chosen will depend on the technical application and on which illumination that is used. For example, in the case of azobenzene as photo-responsive moiety, the illumination used is within the UV-range, preferably in the range of from 100 to 400 nm.

The second domains 22 in FIG. 2 may contain a material not responsive to illumination, for example a non-illumination responsive polymer, or an inorganic material such as a metal. For example, the second layer may be a non-photoactive polymer material, or an inorganic material.

Figure 3:
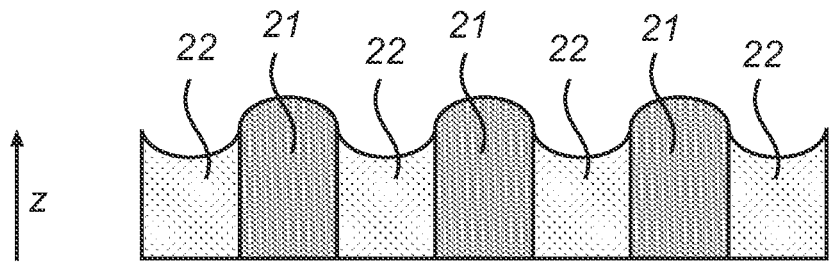
FIG. 3 shows a different embodiment of the photo-responsive layer according to embodiments of the invention in its active state.

Alternatively, the second material may have a second molecularly ordered phase, different from the first molecularly ordered phase, comprising molecules having a photo-responsive moiety, wherein the second domain is capable of undergoing a geometrical change when the photo-responsive moiety of the second domain is exposed to illumination, wherein the geometrical change is different from the geometrical change of the first domain. An example of such geometrical change is illustrated in FIG. 3. For example, the second material may be a liquid crystal polymer material, and the second molecularly ordered phase may be a homeotropic phase. Alternatively, the second material may comprise an isotropic phase. Preferably, the second domain is capable of a reverse geometrical change to passive state when no longer under exposure to the illumination.

The shapes, sizes and distribution of first and second domains in the layer may be varied as desired depending on the technical application and/or manufacturing considerations. The first and second domains may be irregularly distributed or may be arranged in a regular pattern in the photo-responsive layer. For example, the layer may comprise alternating first and second domains. The geometrical change is dependent on the arrangement of the domains and the type of photo-responsive moiety in combination with irradiation wavelength that is used.

Figure 4A:
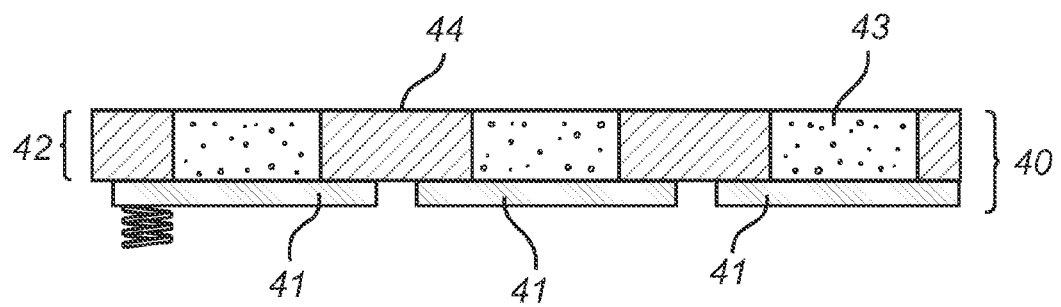
FIGS. 4a and 4b show a cross-sectional view of a photo-responsive layer assembly according to embodiments of the invention in its passive state (4a) and in its active state (4b).
Figure 4B:
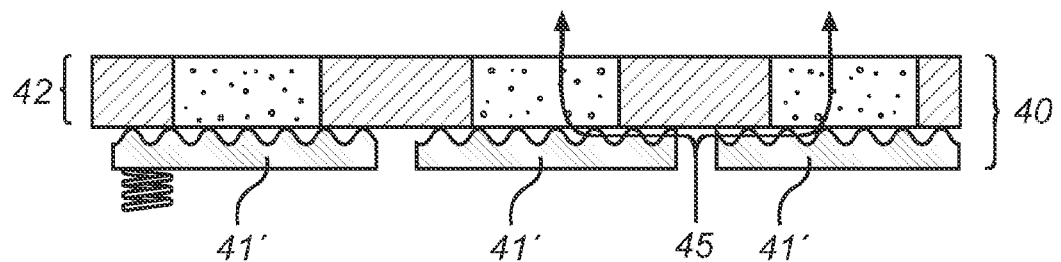
Figure 4C:
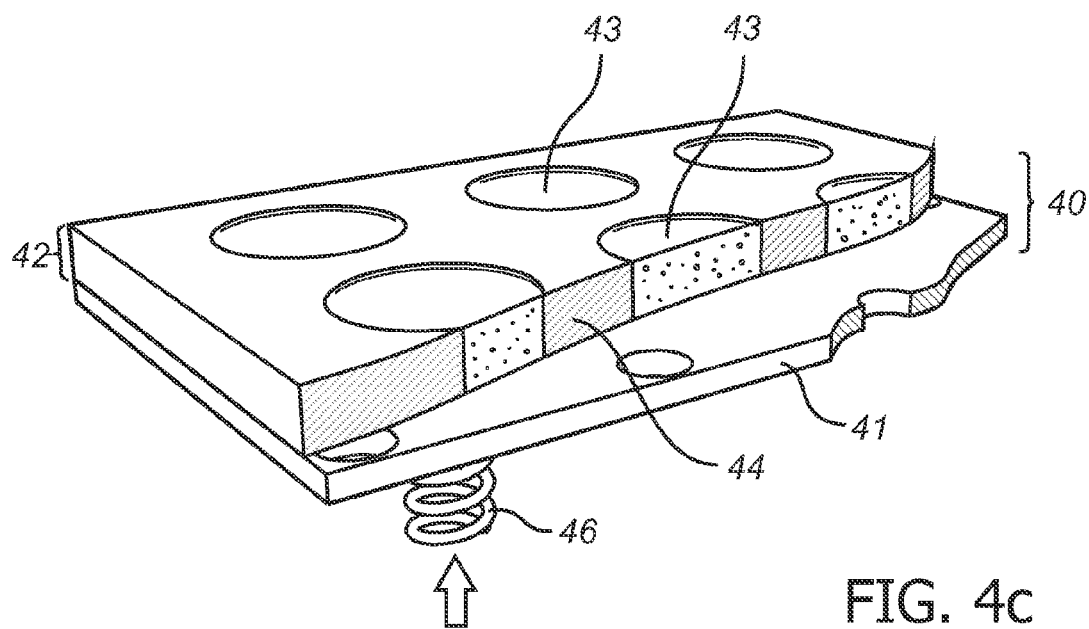
FIGS. 4c and 4d show cross-sectional perspective views of a of photo-responsive layer assembly according to embodiments of the invention in its passive state (4c) and in its active state (4d).
Figure 4D:
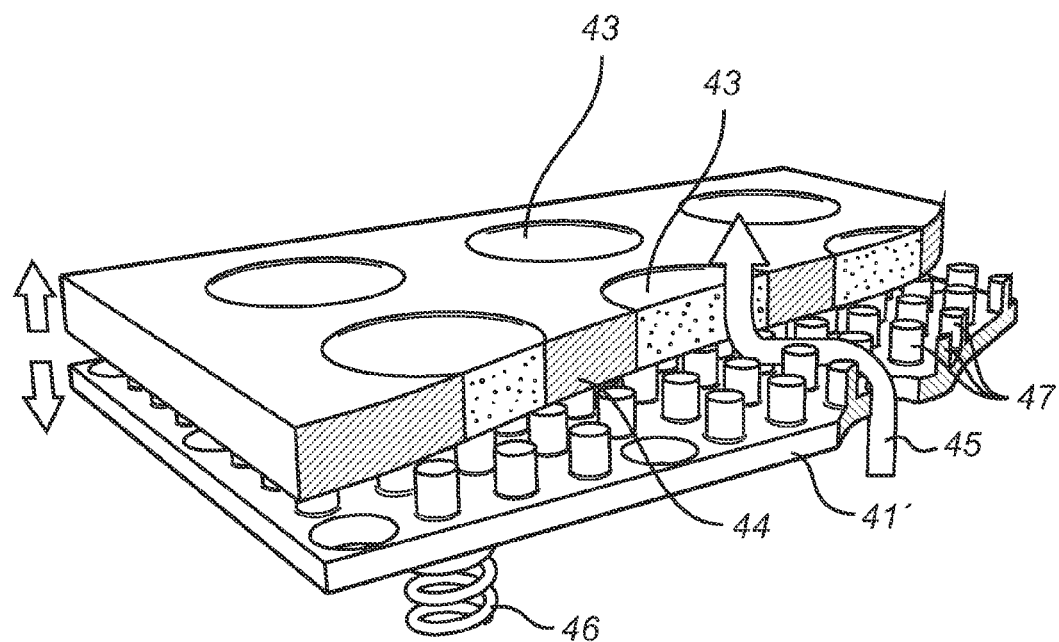

Referring to FIGS. 4a-d, a photo-responsive layer assembly 40 according to embodiments of the invention is shown, wherein FIGS. 4a and 4c shows the photo-responsive layer assembly 40 in passive state, and FIG. 4b and FIG. 4d shows an active state of the photo-responsive layer assembly 40. According to this embodiment, the photo-responsive layer assembly 40 comprises a fluid transmissive layer 42, and a photo-responsive layer 41. The transmissive layer 42 can be formed of porous transmissive membranes 43 and a membrane carrier 44 which is non-transmissive. The transmissive layer 42 may for example comprise a non-transmissive carrier 44 made from metal with openings in which the porous transmissive membranes 43 fit. The layer assembly 40 may be used as a membrane or valve which allows water to flow during active state, but prevent flow of fluid, e.g. water comprising contaminants during passive state.

In its passive state (see FIGS. 4a and 4c), the photo-responsive layer 41 exhibits a surface structure which prevent flow of fluid comprising contaminants through the transmissive layer. For example, the photo-responsive layer 41 may be a smooth layer which is arranged in contact with the transmissive layer 42 so that water is not allowed to pass through the transmissive membranes 43 of the transmissive layer 42. Alternatively, in passive state, the photo-responsive layer 41 is arranged so that a small fluid path is allowed, in which water may pass through the transmissive parts but in which contaminants cannot pass. This is achieved by using a fluid path which is smaller that the size of the contaminant which is to be prevented from passing through the layer assembly 40.

Upon photo-activating illumination, the layer 41 is shifted to an active state 41', that is a state of fluid transmissive arrangement or high flow arrangement with the transmissive layer 42 (see FIGS. 4b and 4d). Since the photo-responsive layer is exposed to photo-activating illumination, photo-active domains, such as the first domains 21, undergo a geometrical change, such as the formation of protrusions 47, which results in that at least one fluid path or channel 45 is formed between the photo-responsive layer 41 and the transmissive layer 42. The fluid path 45 allows for flow/high flow of fluid, e.g. water, through the photo-responsive layer assembly 40 since due to the geometrical change fluid is allowed to pass through the transmissive parts 43 of the transmissive layer 42. Hence, in active state, the fluid transmissive assemble according to the invention hence comprises at least one fluid path 45 passing by or through the photo-responsive layer 41 and the transmissive layer 42, wherein flow through the photo-responsive layer assembly 40 is allowed or increased.

In passive state, the photo-responsive layer assembly 40 preferably has a maximum average path diameter in the range of 0 to 0.02 μm. Thereby, the photo-responsive layer assembly may function as a water filter which admits a flow of water, but which prevent pathogenic contaminants such as viruses, bacteria, protozoa and fungi to pass the layer assembly in passive state. In active state the fluid path diameter is more than 0.02 μm, such as between 0.02 and 5 μm, or higher.

In alternative embodiments of the photo-responsive assembly, when exposed to photo-activating illumination, the first domains 21 form recessions which allows for water to pass through the transmissive layer 42.

In alternative embodiments of the photo-responsive assembly 40, the transmissive layer 42 is formed of only one material which is porous and which admits flow of liquid/fluid through the material. The pore diameter of the transmissive layer 42 or transmissive membranes 43 may be in the range of from 0.001 to 1000 μm, and preferably in the range of 0.01 to 10 μm, and even more preferably in the range of from 0.02 to 1 μm.

Optionally the two layers 41 and 42 may be clamped with a spring 46 or may be glued together at their edges and use water pressure to form contact between the layers.

A further aspect of the invention relates to a method for controlling a flow of fluid using a photo-responsive layer of the invention, comprising exposing the photo-responsive layer to UV-radiation, such that the photo-responsive layer undergoes a topographical change in response to UV-radiation, whereby the photo-responsive layer shifts from a state of fluid-tight arrangement or low flow arrangement (FIG. 4a) with the transmissive layer to a state of fluid transmissive or high flow arrangement or high flow arrangement (FIG. 4b) with the transmissive layer, the fluid transmissive arrangement comprising at least one fluid path passing by the photo-responsive layer to the transmissive layer, wherein flow through the photo-responsive layer assembly is allowed or increased. This method will be further elucidated below in connection with the description of exemplary embodiments.

To summarize, the light (UV) responsive assembly opens when illuminated and closes in absence of photo-activating illumination. Below a number of embodiments of photo-responsive layers that are capable of providing this function are provided, and which may be applied in a photo-responsive assembly as described above. The person skilled in the art realizes that the present invention by no means is limited to the preferred embodiments described below. On the contrary, many modifications and variations are possible within the scope of the appended claims.

Exemplary Embodiment 1

This embodiment corresponds to the photo-responsive layer of FIG. 2b, which is prepared by the production method described below. In this embodiment the photo-responsive layer comprises a material comprising first domains of a chiral nematic (cholesteric) structure, hence comprising alternating planarly oriented molecules and randomly oriented molecules. The areas of planarly oriented molecules form the first domains and the areas with randomly oriented molecules i.e. isotropic form the second domains. In this example, the same composition is applied over the surface of the substrate. The material of first domains and second domains contains a polymerized material based on the monomers and specific concentrations shown in Table 1.

TABLE 1

Chemical structures of the monomers used in embodiment 1

| Material | Chemical structure | Typical concentration |
|---|---|---|
| Monomer 1 | $H_2C{=}CH{-}C({=}O){-}O{-}(CH_2)_6{-}O{-}C_6H_4{-}C({=}O){-}O{-}C_6H_3(CH_3){-}O{-}C({=}O){-}C_6H_4{-}O{-}(CH_2)_6{-}O{-}C({=}O){-}CH{=}CH_2$ | 10 to 90 wt. % More typically 20 to 50 wt. % |
| Monomer 2 | $H_2C{=}CH{-}C({=}O){-}O{-}(CH_2)_6{-}O{-}C_6H_4{-}C({=}O){-}O{-}C_6H_4{-}CN$ | 10 to 90 wt. % More typically 20 to 50 wt. % |
| Monomer 3 | $H_2C{=}CH{-}C({=}O){-}O{-}(CH_2)_6{-}O{-}C_6H_4{-}O{-}C({=}O){-}C_6H_4{-}O{-}(CH_2)_5{-}CH_3$ | 10 to 90 wt. % More typically 20 to 50 wt. % |
| Monomer 4 | Diacrylate based on isosorbide with aromatic ester linkages: $CH_2{=}CH{-}C({=}O){-}O(CH_2)_4O{-}C({=}O){-}C_6H_4{-}C({=}O){-}O{-}[\text{isosorbide}]{-}O{-}C({=}O){-}C_6H_4{-}C({=}O){-}O(CH_2)_4O{-}C({=}O){-}CH{=}CH_2$ | 1 to 50 wt. %. |

TABLE 1-continued

Chemical structures of the monomers used in embodiment 1

| Material | Chemical structure | Typical concentration |
| --- | --- | --- |
| Monomer 5 | 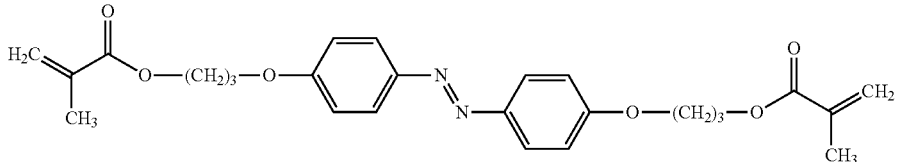 | 1 to 80 wt. % More typically 2 to 10 w % |
| Photo-initiator Irgacure 819 (CIBA Specialty Chemicals) | 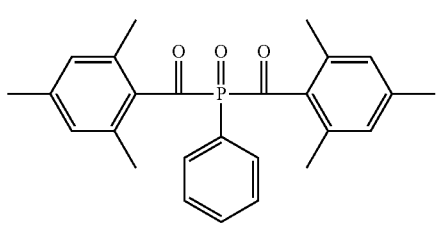 | 0.1 to 5 wt. % More typically 1 wt. % |

The photo-responsive layer hence comprises photosensitive monomers, such as azobenzene (monomer 5) in the range of from 1 to 80% by weight, capable of undergoing trans to cis isomerization, preferably 2 to 10% by weight. In addition, the photo-responsive layer comprises one or several types of monomer capable of inducing a helical molecularly ordered phase. Optionally, this set of monomers includes a chiral monomer (monomer 4), at a content in the range of from 1 to 50% by weight, which is capable of forming an molecularly ordered phase, such as a chiral nematic phase. When needed, the composition may further comprise further monomers (such as monomer 1-3) for example for controlling the cross-linking and the viscosity of the polymer. For example, such optional monomers may be a LC diacrylate monomer in the range of from 10 to 90% by weight, preferably 20 to 50% by weight. The photo-initiator is preferably chosen such that it can be activated by wavelengths above 400 nm, avoiding photo-activation of the azocompound.

The above composition is chosen to provide desired processibility at room temperature, crosslink density of the polymer network to be made, and pitch of the chiral-nematic helix with regard to the photo-response.

An example of an advantageous composition has been found to be (see Table 1 for reference to specific monomers):
  28 wt.% monomer 1
  16 wt.% monomer 2
  40 wt.% monomer 3
  6 wt.% monomer 4
  8 wt.% monomer 5
  2 wt.% photo-initiator Irgacure 819

Figure 5:
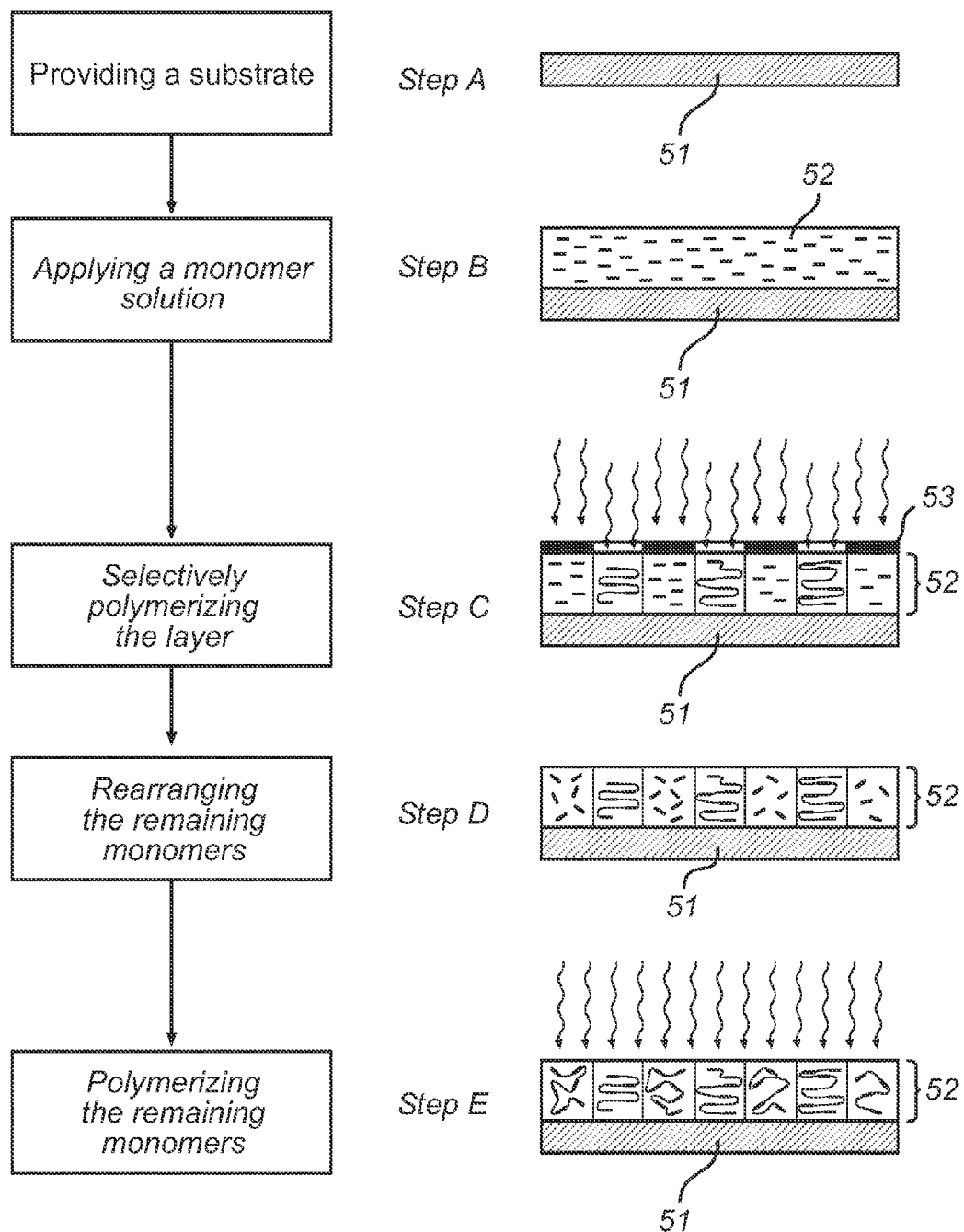
FIG. 5 schematically illustrates the steps of a first method for producing a photo-responsive layer according to an embodiment of the invention.

The preparation of the photo-responsive layer of this embodiment will now be described. The method is illustrated in FIG. 5 and comprises providing a layer substrate (step a); applying a solution to the substrate (step b), wherein the solution comprises a monomer being both UV-radiation responsive and capable of forming an molecularly ordered phase, and/or a monomer being UV-radiation responsive and a monomer capable of forming a molecular ordered phase, such as a helical molecular ordered phase, and a photo-initiator; selectively polymerizing a first domain of the monomers by photo-polymerization (step c); rearranging the monomers in the second domain e.g. by either heating or applying an electrical field or an external magnetic field (FIG. 5d); and allowing the second domain to polymerize by photo-polymerization (FIG. 5e). For example, the monomer solution may comprise a monomer bearing one or multiple reactive groups and a monomer capable of forming a helical molecular ordered phase.

In detail, the monomer mixture, dissolved in an organic (60/40 w/w monomer/xylene) was spread on a substrate 51, e.g. made of cellulose triacetate. The substrate 51 was rubbed with a polyester tissue prior to coating in order to enhance planar alignment of the liquid crystal polymer material. Alternatively a glass substrate which is pre-coated with an alignment layer may be used. For example, polyimide was used which after curing was also rubbed with the polyester tissue.

A 25 μm thick layer 52 was applied using a doctor blade coater. After doctor blading, the wet layer was heated to 60° C. for 5 minutes to allow the xylene to evaporate and was then subsequently cured at 40° C. by exposure through a mask 53 using the 405 nm Hg line of a mercury lamp. Thereby the photo-initiator was activated in the areas of the layer 52 which were exposed to UV. As a result, the monomers in these areas were polymerized, forming the first domains. In contrast, areas not exposed to UV were not polymerized. These non-polymerized areas correspond to the second domains. Next, the layer was heated to 90° C., at which the not reacted monomers in the not exposed areas of the first exposure become isotropic. This isotropic state is then frozen by a second UV exposure. Optionally a mask may be used also in this second UV-exposure in order to create advanced domain patterns, for example in order to create channels. Optionally a temporary second substrate can be used in this process to assure a flat surface.

The pattern of first and second domains that is made by the mask exposure can be varied using different masks. For example dots with a diameter of 10 μm and lines of around 20 μm separated 20 μm from each other were possible to produce. Lines with a smaller pitch, e.g. 2 μm, were made by exchanging the first mask exposure with a holographic exposure using an $Ar^+$ laser at its 488 nm line. In case of line patterns their orientation of the photo responsive layer should be such that free water flow is not hindered.

Photo-responsive layer assemblies were produced by bringing the patterned layer in contact with a construct containing a transmissive layer as illustrated in FIG. 4.

The photo-responsive layer is responsive for light below 400 nm. Upon exposure the surface deform and a slit was created between the transmissive layer and the photo-responsive layer of around 2.5 μm leaving sufficient space to allow water to transmit. When the light was reduced or switched off, the surface reliefs disappeared immediately and the water flow was blocked. The deformation depended on the thickness of the layer. It was found that by increasing the thickness of the photo-responsive layer larger deformation were formed.

Exemplary Embodiment 2

This embodiment corresponds to the photo-responsive layer in FIG. 3. This embodiment is similar to embodiment 1, with the difference that in the photo-responsive layer, the isotropic (randomly oriented) areas are replaced by areas with molecular order such that there is a preferential orientation of the molecules perpendicular to the surface (homeotropic orientation). As a result, the photo-induced surface deformation is larger and deformations >4 μm are obtained compared to embodiment 1.

Homeotropic areas are obtained by carrying out the second UV-exposure under an externally applied electrical field. The monomer composition is somewhat adjusted in order to obtain a larger dielectric anisotropy:

28 wt.% monomer 1
40 wt.% monomer 2
16 wt.% monomer 3
6 wt.% monomer 4
8 wt.% monomer 5
2 wt.% photo-initiator Irgacure 819

The photo-responsive assembly may be produced as described for Exemplary embodiment 1 and applied in a photo-responsive layer assembly according to for example FIG. 4.

Exemplary Embodiment 3

Figure 6A:
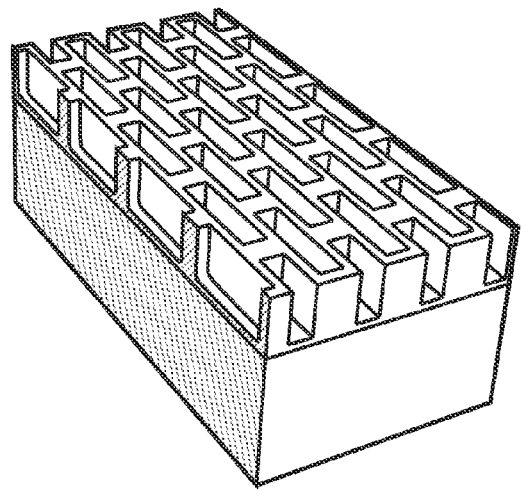
FIG. 6a illustrates a grid layer used for providing second domains according to an embodiment of the invention.

This embodiment corresponds to the photo-responsive layer in FIG. 2b. In this embodiment the photo-responsive layer is made by filling a grid obtained from a lithographic material with the monomer mixture of embodiment 1. The grid can for instance be made from SU-8 (microchem) on a substrate containing an alignment layer to assure the formation of a chiral nematic order with planar alignment. An example of such a grid and a schematic representation of making the photo-responsive layer according to the third embodiment are shown in FIGS. 6a and b.

The preparation of the photo-responsive layer according to this embodiment will now be described. A discontinuous layer 61 on a substrate 62 is provided with a grid layer, for example by using a SU-8 photo resist material 61. Thereafter, a solution comprising a monomer being photo-responsive and optionally a photo-initiator is applied on at regions 63 of the substrate not covered by the discontinuous layer. Thereby, the first domains are formed. The film is then exposed to light with wavelengths slightly above 400 nm in order to polymerizing/allowing the monomers of a first domain to polymerize. Optionally, the method further comprises removing unreacted monomers.

Exemplary Embodiment 4

Figure 6B:
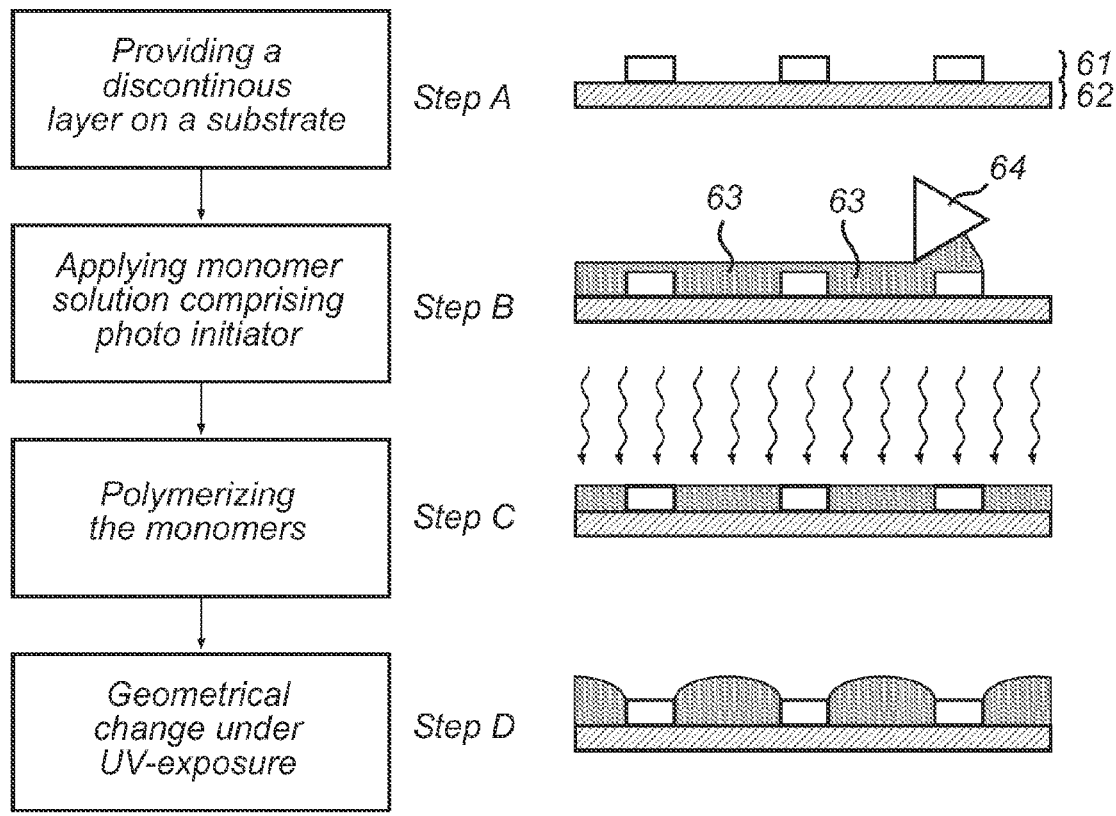
FIG. 6b schematically illustrates the steps of a second method for producing a photo-responsive layer according to an embodiment of the invention.

This embodiment corresponds to the photo-responsive layer in FIG. 2b and preparation method according to FIG. 6b. This embodiment is similar to exemplary embodiment 3 with the difference that the SU-8 photoresist is patterned in lines instead of a grid and that the molecular orientation of the monomers is homeotropic instead of planar. This can be accomplished by conventional means by applying an electrical field during polymerization or by choosing the right combination of monomers and alignment layers. After polymerization, irradiation with light below 400 nm the homeotropically oriented material will shrink in the z-direction and thus form channels.

Exemplary Embodiment 5

This embodiment corresponds to the photo-responsive layer in FIG. 2c and preparation method described with reference to FIG. 4. This embodiment is similar to embodiment 1 with the difference that in this embodiment the first domains are polymerized with a molecular orientation of the monomers which is homeotropic. The second areas are polymerized under such conditions that the monomers are in the isotropic phase.

Exemplary Embodiment 6

This embodiment corresponds to the photo-responsive layer in FIG. 2b, and is similar to exemplary embodiment 3 with the difference that the monomer mixture is now composed of a 50% solution in water/methanol (1/1) of 94:5:1 mixture of N-isopropylacrylamide, N-(4phenylazophenyl) acrylamide and diethyleneglycoldiacrylate. The photo-initiator is a conventional photo-initiator suitable for activation of polymerization above 400 nm. After polymerization the resulting polymer network is above the lower critical solution temperature, LCST, which is at 20° C., and in the collapsed phase. Upon irradiation with light of wavelengths below 400 nm, the photo-activation of the azogroups and the concomitant change in the dipole moment will result in a shift of the LCST to 27° C. and as a result the material will swell considerably.

Exemplary Embodiment 7

Figure 7A:
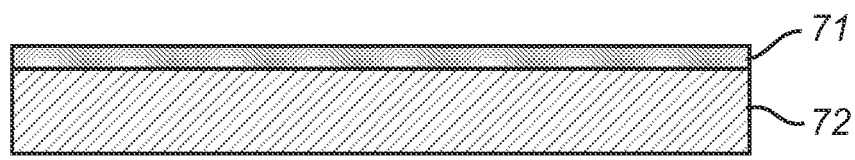
FIGS. 7a and 7b shows a photo-responsive layer including a wrinkling bilayer structure.

This embodiment corresponds to the photo-responsive layer in FIG. 7. In this embodiment, a photo-responsive high modulus layer 71 is arranged on a layer with low modulus 72. The photo-responsive high modulus layer 71 can be a liquid crystal polymer material, and the low modulus layer 72 can be a rubber, such as silicone rubber (polydimethyl siloxane, PDMS). Advantageously, the thickness of the high modulus layer 71 is less than the thickness of the low modulus layer 72.

Figure 7B:
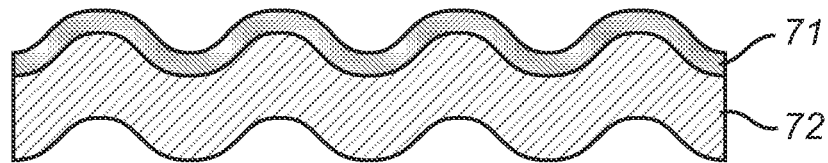

When a thin high modulus layer was applied on a thick low modulus layer, such as a rubber polymer (FIG. 7a), the thin high modulus layer started to wrinkle due to a mismatch in expansion between the layers under photo-activating illumination (FIG. 7b). The mismatch in expansion causes the geometrical change in the high modulus layer. Hence, in this embodiment light-induced wrinkling provides the geometrical change. An example of a composition of the high modulus layer is:

60 wt.% monomer 1
32 wt.% monomer 2
6 wt.% monomer 5
2 wt.% photo-initiator Irgacure 819

The LC layer can be polymerized in an oriented form. After polymerization the modulus of the layer is 1.22 GPa when measured parallel to the orientation and 820 MPa when measured perpendicular to the orientation. In the dark state the layer is straight. The layer is attached to a thick (5 mm thick PDMS layer).

The wrinkling bilayer structure can be used in the photo-responsive layer assembly as shown in FIG. 4. Upon UV exposure the liquid crystal polymer layer tends to expand in the direction perpendicular to the orientation but the presence of the PDMS rubber brings it in a buckling mode. The periodicity and amplitude depends on the thickness of the liquid crystal polymer layer. A 12 µm layer gave upon exposure a buckling periodicity of 278 µm with amplitude of 39 µm. When an 18 µm layer was used, the wrinkling upon exposure gave a periodicity of 416 µm with amplitude of 59 µm. When the light was switched off, the layer straightened again and hence is in contact with the transmissive layer. Hence, the channels were closed when the light was switched off.

The invention claimed is:

1. A fluid purification device comprising a UV-radiation chamber having a fluid inlet and a fluid outlet, said UV-radiation chamber having a UV component to illuminate fluid in the UV-radiation chamber, and a flow control device arranged in said fluid inlet or fluid outlet, wherein said flow control device includes a photo-responsive layer, the photo-responsive layer comprising a first domain comprising a first material comprising molecules having a photo-responsive moiety, wherein said first domain of said photo-responsive layer undergoes a reversible geometrical change when said photo-responsive moiety is exposed to photo-activating illumination.

2. The fluid purification device of claim 1, wherein said first material comprises a first molecularly ordered phase.

3. The fluid purification device of claim 1, wherein said geometrical change provides a topographic change of said photo-responsive layer.

4. A fluid purification device comprising a UV-radiation chamber having a fluid inlet and a fluid outlet, said UV-radiation chamber having a UV component to illuminate fluid in the UV-radiation chamber, and a flow control device arranged in said fluid inlet or fluid outlet, wherein said flow control device includes a photo-responsive layer, the photo-responsive layer comprising a first domain comprising a first material comprising molecules having a photo-responsive moiety, wherein said first domain of said photo-responsive layer undergoes a reverse geometrical change when said photo-responsive moiety is not under exposure to photo-activating illumination.

5. The fluid purification device of claim 1, wherein said first material is a liquid crystal polymer material.

6. The fluid purification device of claim 2, wherein said first molecularly ordered phase is a nematic phase.

7. The fluid purification device of claim 1, wherein said photo-responsive moiety is a moiety that can undergo photo-isomerization.

8. The fluid purification device of claim 1, further comprising a second domain comprising a second material which undergoes a reversible geometrical change when exposed to photo-activating illumination.

9. The fluid purification device of claim 8, wherein said second domain comprises a second material which has a second molecularly ordered phase, different from said first molecularly ordered phase, comprising molecules having a photo-responsive moiety, wherein said second domain undergoes a geometrical change when said photo-responsive moiety of said second domain is exposed to photo-activating illumination, wherein the geometrical change is different from the geometrical change of said first domain.

10. The fluid purification device of claim 8, wherein said second material is a liquid crystal polymer material.

11. The fluid purification device of claim 8, further comprising a fluid transmissive layer, wherein the photo-responsive layer is arranged in contact with said transmissive layer, and wherein, under photo-activating illumination, said photo-responsive layer undergoes a topographic change allowing for opening of at least one fluid path passing by said photo-responsive layer and said transmissive layer allowing for flow, or increased flow, of fluid through the contacting arrangement formed of the photo-responsive layer with the transmissive layer.

12. The fluid purification device of claim 1, wherein the UV component is a UV lamp.

13. The fluid purification device of claim 1, wherein the UV component is a UV transmissive layer.

14. The fluid purification device of claim 4, wherein the UV component is a UV lamp.

15. The fluid purification device of claim 4, wherein the UV component is a UV transmissive layer.

* * * * *